June 5, 1962 L. PAIST 3,038,110
CONTROL CIRCUIT FOR INDICATING THE VOLTAGE DROP
OF A BATTERY BELOW A PREDETERMINED VALUE
Filed Oct. 28, 1960
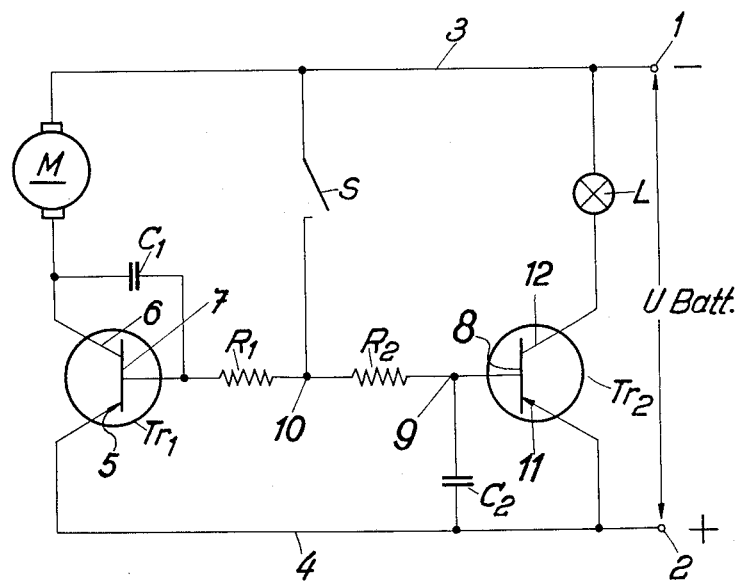
Inventor:
LEO PAIST United States Patent Office 3,038,110
Patented June 5, 1962

3,038,110
CONTROL CIRCUIT FOR INDICATING THE VOLTAGE DROP OF A BATTERY BELOW A PREDETERMINED VALUE
Leo Paist, Dettingen, Teck, Germany, assignor to Bolkow-Entwicklungen Kommanditgesellschaft, Ottobrunn, near Munich, Germany
Filed Oct. 28, 1960, Ser. No. 65,754
Claims priority, application Germany Nov. 24, 1959
13 Claims. (Cl. 318—490)

The present invention relates to a circuit for indicating the voltage drop of a battery below a predetermined value or level which may be used, for example, in the case of a battery-operated direct-current motor of audio-transducer means, such as a phonograph, tape recorder, soundtrack reproducer, etc.

The motors of such appliances are controlled by centrifugal governors or switches which cause the motor to rotate at a constant number of revolutions, independently of the magnitude of the battery voltage. However, in order to effect such regulation, the battery voltage must be at a sufficiently high level. However, if the voltage drops below a predetermined value, regulation of the speed of the motor is terminated. This becomes unpleasantly apparent in the change of pitch or in the reduction in the audibility of the sound, or in the poor quality of the sound reproduction. Consequently, it is necessary to provide an indication of the magnitude of the battery voltage so as to be able to note, in time, that the rotation of the motor is no longer properly regulated.

It is another difficulty that battery-operated appliances must properly function at any location and in any position, even at operational accelerated conditions to which said appliances may be subjected, as such battery-operated appliances are independent of the prevailing net of electric current.

Since no suitable indication of measuring instruments would be attained when using same due to their sensitivity to vibrations, it becomes necessary to employ measuring devices which are rather insensitive to vibrations and accelerations, but which nevertheless will indicate the drop of voltage level. In relative inexpensive devices using battery-operated components, pilot or indicator lamps are included in the regulating circuit, these lamps being energized by a transformer placed in the regulating circuit.

However, as the motor revolutions decrease in number, this type of regulatory circuit can never provide an exact indication of the battery voltage and consumes continuously current from the rather limited power supply source.

In view of the foregoing, it is an object of the present invention to provide means which result in the obviation of the disadvantages of the prior art regulatory circuits and which, moreover, result in a highly novel and efficient regulation device for a battery-operated motor, or the like.

It is another object of the present invention to provide means for attaining a new circuit path for indicating the decrease in battery voltage.

It is a further object of the present invention to provide means to effect a simple and inexpensive Yes–No indication of the voltage level of the battery.

Other and further advantages and objects of the present invention will become apparent to one skilled in the art from reading the following specification in connection with the appended drawing.

The sole FIGURE of the appended drawing, which illustrates the best mode presently contemplated for carrying out the invention, is a wiring diagram of a regulatory circuit pursuant to the present invention.

Briefly described, the present invention provides an arrangement wherein a voltage indicator is placed in the collector circuit of the transistor. The pulses of the centrifugal switch, which is utilized to regulate the number of revolutions of the drive motor, are transmitted through an RC combination to the base electrode of the transistor. The RC time constant is so chosen relative to the normal pulse frequency, resulting from operation of the centrifugal governor switch, that the proportionate part of the direct current applied to the base of the transistor is too small to energize the indicator. However, if the battery voltage decreases so that a change results due to the change in the operation of the centrifugal governor switch, the pulse repetition ratio is so changed that, due to operation of the RC integrator, the base electrode of the transistor receives a sufficiently large portion of the direct current that the indicator, which is in the collector circuit of the transistor, is energized by the amplified direct current output of the transistor.

Consequently, pursuant to the present invention, there is provided a simple and inexpensive Yes–No indicating means for the battery voltage level. This makes it impossible to obtain a wrong reading or indication of the voltage level and particularly distinguishes between proper and improper voltage levels as a result of minimum energy consumption during the regulation operation.

Energy consumption is increased only if the battery voltage level drops below a predetermined value. However, this cannot disturb the operation of the circuit, since due to the response of the circuit the operation of the motor, and the appliance run thereby, has been terminated. In its simplest form, the indicator is constituted by a signal lamp. However, it is within the scope of the present invention to utilize other types of signal or display devices.

Referring now to the drawing in detail a battery U Batt. is connected at its negative terminal 1 to line 3 and at its positive terminal 2 to line 4. Line 4 is connected to the emitter 5 of a transistor $Tr_1$. The collector 6 of the transistor is connected to one terminal of the motor M. The other motor terminal is connected by line 3 to the negative battery terminal 1.

The rotor axis of motor M is not illustrated. However, there is schematically shown the centrifugal governor switch S of the motor. It will be understood that switch S is closed when the motor M is inoperative. One end of switch S is connected to line 3 and the other end of the switch is connected through resistor $R_1$ to the base 7 of transistor $Tr_1$. A condenser $C_1$ is connected between the collector 6 and the base 7 of the transistor. The described portion of the wiring diagram forms a regulator circuit for maintaining the revolutions of motor M at a constant number independently of the voltage level of the battery. When the battery voltage drops it no longer causes an undesirable operating condition for the circuit.

Pursuant to the present invention, the regulation circuit is provided with a second transistor $Tr_2$. The base 8 of the second transistor is connected to the junction 9 of an RC combination constituted by resistor $R_2$ and capacitor $C_2$. The other end of the capacitor is connected to line 4. The other end of resistor $R_2$ is connected to the junction 10 of switch S and resistor $R_1$. The emitter 11 of transistor $Tr_2$ is connected to line 4 and the collector 12 thereof is connected to one end of the indicator device, here shown as lamp L. The other end of the indicator device is connected to line 3.

The time constant of RC combination $R_2C_2$ is so chosen that during normal operation of the centrifugal switch S the normal pulse repetition or frequency rate produced thereby results in charging and discharging the RC combination at such a rate that only a relatively small direct current is applied to transistor base 8 insufficient to cause a transistor output sufficient to energize lamp L. In effect, the transistor operates as an open switch. Consequently, the current flow across lamp L and transistor $Tr_2$, which are connected in series across the battery terminals 1 and 2, is insufficient to energize the lamp L.

However, if the voltage level of the battery drops to such a point that the rate of speed of motor M drops the centrifugal switch remains closed during a longer time interval whereby its pulse repetition rate or frequency decreases. This results in a change in the charging rate of the RC combination, so that the voltage pulses applied thereto are integrated to provide a larger potential or D.C. current at the base 8. This causes amplified current flow through the transistor $Tr_2$ sufficient to energize lamp L so that the operator of the appliance can recognize a decrease in the voltage level of the battery.

An additional advantage of the indicator means L resides in the fact that it is energized for a short time by the starting or initial current through the appliance. This is due to the fact that the centrifugal switch S is closed when the appliance is inoperative. This provides an indication at the start of the appliance that it is operating. The indicator remains energized when the appliance is incapable of functioning or is inoperative.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. In a circuit for regulating the operation of audio transducer means operated by a direct current motor from a direct current supply, said circuit including a centrifugal switch responsive to operation of the motor, means for indicating a drop in the voltage level of said supply beyond a predetermined point, said indicating means including transistor means, an indicator energized in response to the energization of said transistor means, and means to energize said transistor means in response to a predetermined repetition frequency of said centrifugal switch.

2. A circuit as in claim 1, said switch means being in a series circuit with said transistor energizing means, and said series circuit being connected across said supply.

3. A circuit as in claim 2, said transistor energizing means being a charging circuit pulsed in response to the closing of said switch.

4. A circuit as in claim 2, said transistor energizing means being a resistor-capacitor combination having a predetermined time constant.

5. A circuit as in claim 4, said transistor means being in a series circuit with said indicator means, and said series circuit being connected across said supply.

6. A circuit as in claim 5, said capacitor being connected across said transistor means.

7. A circuit as in claim 6, the emitter of said transistor means being connected to one terminal of said supply, the base of said transistor being connected to the terminal junction of said resistor and capacitor, the collector of said transistor being connected to one terminal of said indicator and the other indicator terminal being connected to the other terminal of said supply.

8. A circuit as in claim 7, said switch being connected between the other supply terminal and the other resistor terminal.

9. A circuit as in claim 1, said regulating circuit including additional transistor means in series circuit with said motor, said series circuit being connected across the terminals of said supply, and said switch having one terminal connected to one terminal of said supply, and the other switch terminal being in series circuit with the base of said additional transistor means.

10. A sound recording and reproducing device with two spool plates for receiving a recording tape, a recording and reproducing head, a motor for driving said recording tape, a power supply for supplying power to the motor, a centrifugal governor fitted onto the axle of the motor for regulating the number of revolutions, a transistor in parallel with the motor current circuit having an indicating device in series with the collector of said transistor and being connected with its base to said centrifugal governor through a resistor-capacitor combination, said resistor-capacitor combination having such a time constant, that the switching pulses generated by said centrifugal governor in function of the motor-r.p.m. open said transistor, when the voltage level of said power supply drops below a certain value which is indicated by said indicating device.

11. A sound recording and reproducing device according to claim 10, wherein in the case of starting the operation of the direct-current motor due to the closing of the centrifugal governor during standstill of the motor and due to the opening of the transistor, the indicating device is for a short time current-carrying, whereby the function of the power supply is manifested.

12. A sound recording and reproducing device according to claim 10, including a further transistor in series with the motor circuit, whereby the base of the further transistor is connected with the governor via a resistor.

13. In a sound recording and reproducing device having a motor, a direct current supply source including a circuit to which said motor is connected; a centrifugal governor operatively connected to said motor for regulating the number of revolutions thereof, a transistor in parallel to said circuit, and indicating means in series with the collector of said transistor and including a resistor-capacitor combination to which said centrifugal governor is connected via the base of said transistor, said resistor-capacitor combination having a time constant, so that switching pulses generated by said centrifugal governor in function of the number of revolutions of said motor open said transistor, when the voltage level of said current supply source drops below a predetermined value manifested by said indicating means.

No references cited.